(12) United States Patent
Kumar et al.

(10) Patent No.: US 11,720,457 B2
(45) Date of Patent: Aug. 8, 2023

(54) REMOTE DIRECT MEMORY ACCESS (RDMA)-BASED RECOVERY OF DIRTY DATA IN REMOTE MEMORY

(71) Applicant: VMware, Inc., Palo Alto, CA (US)

(72) Inventors: Keerthi Kumar, Bangalore (IN); Halesh Sadashiv, Bangalore (IN); Sairam Veeraswamy, Coimbatore (IN); Rajesh Venkatasubramanian, San Jose, CA (US); Kiran Dikshit, Banglore (IN); Kiran Tati, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/876,395

(22) Filed: Jul. 28, 2022

(65) Prior Publication Data

US 2022/0365855 A1 Nov. 17, 2022

Related U.S. Application Data

(63) Continuation of application No. 17/321,673, filed on May 17, 2021, now Pat. No. 11,436,112.

(51) Int. Cl.
| | | |
|---|---|---|
| *G06F 11/00* | (2006.01) | |
| *G06F 11/20* | (2006.01) | |
| *G06F 15/173* | (2006.01) | |

(52) U.S. Cl.
CPC ...... *G06F 11/2046* (2013.01); *G06F 11/2023* (2013.01); *G06F 11/2038* (2013.01);
(Continued)

(58) Field of Classification Search
CPC ............ G06F 11/2023; G06F 11/2038; G06F 11/2046; G06F 11/2094
See application file for complete search history.

(56) References Cited

U.S. PATENT DOCUMENTS

| 8,904,117 B1 | 12/2014 | Kalekar et al. | |
|---|---|---|---|
| 2012/0159101 A1* | 6/2012 | Miyoshi | G06F 12/109 |
| | | | 711/E12.103 |

(Continued)

OTHER PUBLICATIONS

Notice of Allowance issued in Related U.S. Appl. No. 17/320,023, dated May 19, 2022.
(Continued)

*Primary Examiner* — Michael Maskulinski (57) ABSTRACT

Techniques for implementing RDMA-based recovery of dirty data in remote memory are provided. In one set of embodiments, upon occurrence of a failure at a first (i.e., source) host system, a second (i.e., failover) host system can allocate a new memory region corresponding to a memory region of the source host system and retrieve a baseline copy of the memory region from a storage backend shared by the source and failover host systems. The failover host system can further populate the new memory region with the baseline copy and retrieve one or more dirty page lists for the memory region from the source host system via RDMA, where the one or more dirty page lists identify memory pages in the memory region that include data updates not present in the baseline copy. For each memory page identified in the one or more dirty page lists, the failover host system can then copy the content of that memory page from the memory region of the source host system to the new memory region via RDMA.

21 Claims, 4 Drawing Sheets

(52) U.S. Cl.
CPC .... *G06F 11/2094* (2013.01); *G06F 15/17331* (2013.01); *G06F 2201/85* (2013.01)

(56) References Cited

U.S. PATENT DOCUMENTS

| | | | |
|---|---|---|---|
| 2014/0089447 A1* | 3/2014 | Uchida | H04L 67/1097 709/212 |
| 2015/0012776 A1 | 1/2015 | Banikazemi et al. | |
| 2017/0300394 A1 | 10/2017 | Raut | |
| 2019/0018746 A1 | 1/2019 | Haid et al. | |
| 2019/0129814 A1 | 5/2019 | Tati et al. | |

OTHER PUBLICATIONS

Related U.S. Appl. No. 17/321,673, filed May 17, 2021, entitled "Remote Direct Memory Access (RMDA)-Based Recovery of Dirty Data in Remote Memory".

\* cited by examiner

REMOTE DIRECT MEMORY ACCESS (RDMA)-BASED RECOVERY OF DIRTY DATA IN REMOTE MEMORY

CROSS-REFERENCES TO RELATED APPLICATIONS

This present application is a continuation of U.S. patent application Ser. No. 17/321,673 filed May 17, 2021, now U.S. Pat. No. 11,436,112 issued Sep. 6, 2022, entitled "Remote Direct Memory Access (RDMA)-Based Recovery of Dirty Data in Remote Memory," the content of which is incorporated herein by reference in its entirety for all purposes.

BACKGROUND

Unless otherwise indicated, the subject matter described in this section is not prior art to the claims of the present application and is not admitted as being prior art by inclusion in this section.

In business-critical computing environments, maintaining high availability (HA) of the workloads running in the environments is a key goal. Without HA, such environments are vulnerable to failure events (e.g., power outages, hardware failures, software failures, etc.) that can render their workloads unavailable, resulting in service interruptions and consequent losses in productivity, revenue, and/or business reputation.

According to one HA approach, a workload running on a first (i.e., "source") host system in a computing environment can have its in-memory data flushed on a periodic basis from the source host system's physical memory (e.g., volatile dynamic random-access memory (DRAM) modules, non-volatile DIMMs (NVDIMMs), etc.) to a shared storage backend. If a failure occurs at the source host system, any remaining dirty data in the source host system's physical memory written by the workload since the last periodic flush can be synchronized to the shared storage backend. A second (i.e., "failover") host system in the computing environment can then recover the data from the shared storage backend, thereby allowing the workload to resume execution on that failover host system while the source host system is taken offline for maintenance.

However, a significant issue with this HA approach is that it assumes the operating system (OS) or hypervisor running on the source host system is in a sufficiently operational state after the failure to sync the workload's remaining dirty data to the shared storage backend. This assumption will generally be valid if the failure is a AC power outage—in which case a backup power source such as an on-board battery or uninterruptable power supply (UPS) can provide power to the source host system for a short period of time while the OS/hypervisor completes the dirty data synchronization—or a non-critical error. But this assumption will not be valid if the failure is caused by an unrecoverable error in the OS/hypervisor's kernel (sometimes referred to as a kernel panic).

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to a novel HA approach that leverages remote direct memory access (RDMA) to recover, by a failover host system in a computing environment, dirty data maintained in a physical memory of a source host system in the computing environment at the time of a failure at the source host system. As known in the art, RDMA is a technology implemented at the network interface controller (NIC) level that enables data to be transferred between the physical memories of two networked computer systems without any involvement by the central processing units (CPUs) or OS/hypervisors on either side.

Unlike other HA approaches that require the OS/hypervisor at the source host system to be mostly intact/operational post-failure (in order to flush the dirty data to some destination such as a shared storage backend), the RDMA-based approach of the present disclosure is not limited by this requirement. Accordingly, this RDMA-based approach can be employed in scenarios where the source host system has failed due to an unrecoverable OS/hypervisor kernel error, which is a relatively common occurrence in large-scale computing environments.

2. Example Computing Environment and Solution Architecture

Figure 1:
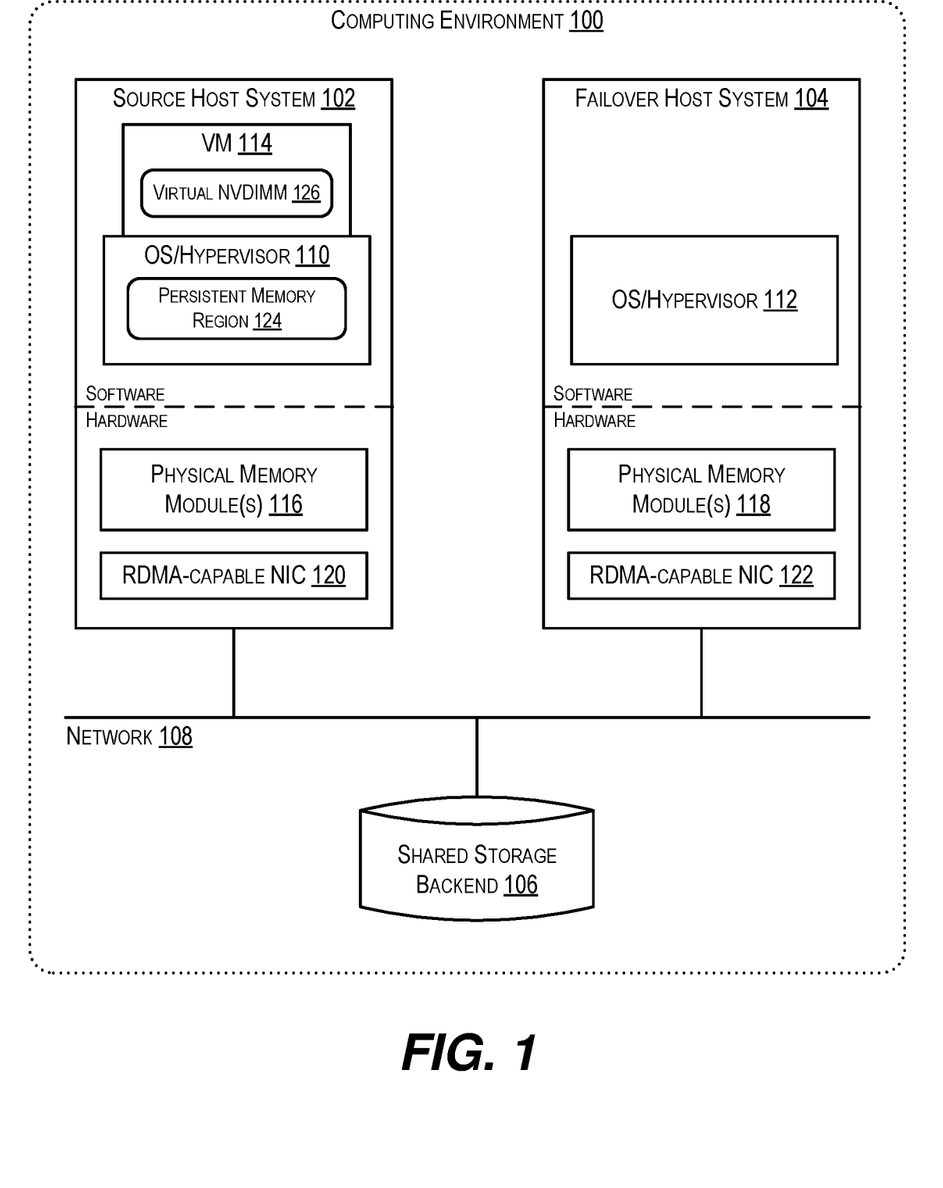
FIG. 1 depicts an example computing environment.

FIG. 1 is a simplified block diagram of an example computing environment 100 in which the techniques of the present disclosure may be implemented. As shown, computing environment 100 includes at least two physical computer systems (i.e., a source host system 102 and a failover host system 104) that are communicatively coupled with each other and with a shared storage backend 106 via a network 108. In one set of embodiments, shared storage backend 106 may be a standalone storage server/appliance (or group of such servers/appliances), such as a storage array. In another set of embodiments, shared storage backend 106 may represent a logical aggregation of storage resources that are part of (i.e., local to) host systems 102 and 104, such as the virtual storage pool of a hyperconverged infrastructure (HCI) cluster.

Each host system 102/104 includes, in software, an OS or hypervisor 110/112 that provides an environment in which user workloads (e.g., applications, virtual machines (VMs), containers, etc.) can run. For example, source host system 102 includes a VM 114 running on its OS/hypervisor 110.

In addition, each host system 102/104 includes, in hardware, one or more physical memory modules 116/118 that provide a byte-addressable memory store for the host system's workloads and a NIC 120/122 that enables communication between the host system and other entities over network 108. NICs 120 and 122 are RDMA capable and thus can transfer data directly between the physical memory modules of their respective host systems via an RDMA-enabled network protocol (e.g., InfiniBand, RDMA over Converged Ethernet (RoCE), or Internet Wide Area RDMA Protocol (iWARP)), without involving OSs/hypervisors 110 and 112.

In FIG. 1, it is assumed that OS/hypervisor 110 of source host system 102 is configured to allocate one or more portions of physical memory module(s) 116 as a persistent memory region 124 and expose persistent memory region 124 in the form of a virtual persistent memory module (or in other words, virtual NVDIMM) 126 to VM 114. As known in the art, persistent memory is a type of computer memory that is byte-addressable like conventional volatile DRAM but is non-volatile in nature like conventional storage. Through this mechanism, the guest processes of VM 114 can access the portion(s) of physical memory module(s) 116 backing virtual NVDIMM 126/persistent memory region 124 using persistent memory semantics (i.e., via byte-addressable memory I/O and with the expectation that any data written there will persist across power cycles).

In addition, it is assumed that some component within the software stack of source host system 102 is configured to periodically flush, to shared storage backend 106, the data written by VM 114 to virtual NVDIMM 126/persistent memory region 124. In the case of a failure at source host system 102 that prevents VM 114 from continuing to run there, this periodic flushing allows failover host system 104 to retrieve the current state of persistent memory region 124 from persistent storage backend 106, reconstruct this region in its physical memory modules 118, and resume execution of VM 114 (or more precisely, a migrated copy of VM 114) using the reconstructed persistent memory region. This periodic flushing also enables the data contents of persistent memory region 124 to be persisted across power cycles of source host system 102 in the scenario where the physical memory modules backing persistent memory region 124 are volatile DRAM modules (rather than actual NVDIMMs).

As indicated in the Background section, one complication with periodically flushing persistent memory region 124 to shared storage backend 106 is that, at the time a failure occurs at source host system 102, there may be some remaining dirty data in persistent memory region 124 that has not been flushed yet (due to being written by VM 114 after the last flush operation). This remaining dirty data must be recovered in some way in order for persistent memory region 124 to be correctly reconstructed on failover host system 104 and for VM 114 to be resumed there. One approach is to employ a post-fail agent in source host system 102 that identifies and synchronizes the remaining dirty data to shared storage backend 106 after the failure has occurred. However, if the failure causes the kernel of OS/hypervisor 110 to crash, the post-fail agent cannot be trusted to correctly carry out its duties and thus this approach cannot be reliably used.

Figure 2:
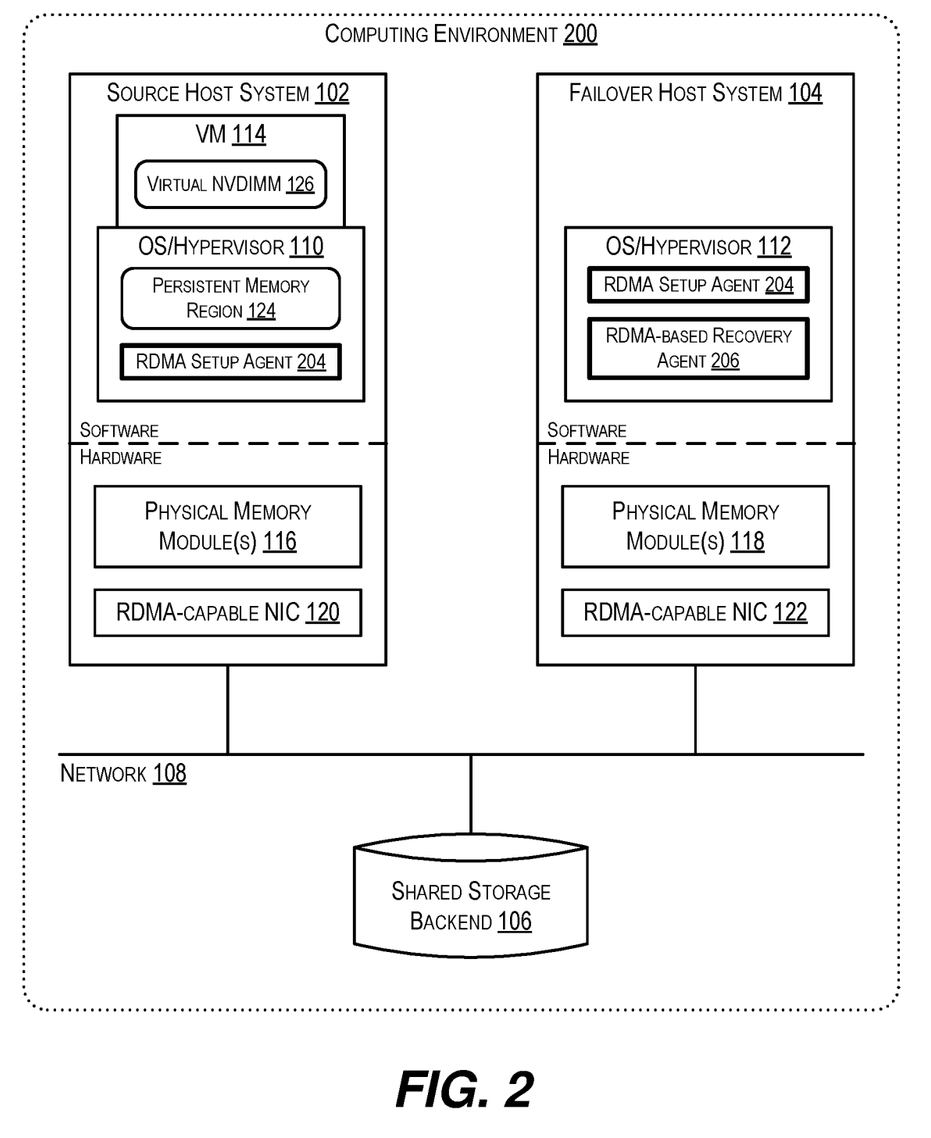
FIG. 2 depicts a modified version of the computing environment of FIG. 1 that implements the techniques of the present disclosure.

To address the foregoing and other similar issues, FIG. 2 depicts a modified version of computing environment 100 of FIG. 1 (i.e., environment 200) that includes a novel RDMA setup agent 202/204 in each host system 102/104 and a novel RDMA-based recovery agent 206 in failover host system 104 according to embodiments of the present disclosure. At a high level, RDMA setup agents 202 and 204 can carry out a setup workflow that involves (1) establishing an RDMA connection between host systems 102 and 104 via respective RDMA-capable NICs 120 and 122, and (2) granting failover host system 104/NIC 122 RDMA access to one or more lists of memory pages in persistent memory region 124 that are dirtied by VM 114 but not yet flushed to shared storage backend 106, as well as to the in-memory data contents of those dirty memory pages.

Further, at the time of a failure at source host system 102 and consequent migration of VM 114 from source host system 102 to failover host system 104, RDMA-based recovery agent 206 can carry out a recovery workflow that involves, inter alia: (1) retrieving a baseline copy of persistent memory region 124 from shared storage backend 106 into a newly-created persistent memory region R on failover host system 104; (2) reading, via the RDMA connection created during the setup workflow, the one or more lists of dirty memory pages for persistent memory region 124 from source host system 102; (3) for each dirty memory page P in the one or more lists, copying, via the RDMA connection, the data contents of P from source host system 102 to an appropriate offset of R, and (4) mapping R to the migrated version of VM 114.

With this general approach, persistent memory region 124 can be fully reconstructed on failover host system 104 in response to a failure at source host system 102, which in turn allows VM 114 to resume execution on failover host system 104 while source host system 102 is repaired or replaced. This is true even if source-side OS/hypervisor 110 is rendered unstable or inoperable by the failure, because the transfer of data via RDMA (per steps (2) and (3) of the recovery workflow above) does not require any involvement by OS/hypervisor 110. Accordingly, unlike other HA approaches, the techniques of the present disclosure provide an HA solution that is robust against a wide variety of commonly occurring failure types/modes, including those that arise out of an unrecoverable OS/hypervisor kernel error.

The remaining sections of this disclosure provide additional details regarding the setup and recovery workflows performed by RDMA setup agents 202, 204 and RDMA-based recovery agent 206, as well as certain modifications to these workflows to support cases in which source host system 102 uses a CPU hardware feature known as Page Modification Logging (PML) to facilitate the tracking of dirtied memory pages. It should be appreciated that the computing environment and solution architecture shown in FIG. 2 are illustrative and not intended to limit embodiments of the present disclosure. For example, although FIG. 2 depicts a single VM and a single virtual NVDIMM/persistent memory region for that VM on source host system 102, in other embodiments there may be multiple VMs running on source host system 102, each with one or more virtual NVDIMMs mapped to corresponding persistent memory regions in OS/hypervisor 110. In these embodiments, the RDMA-based HA approach of the present disclosure may be applied to recover dirty data in each persistent memory region of each such VM.

In addition, while FIG. 2 and the foregoing description assumes that the dirty data being recovered from source host system 102 is data in a persistent memory region, the RDMA-based approach of the present disclosure is not limited to the recovery of persistent memory. Instead, this approach can be broadly applied to recover dirty data in any type of memory region (e.g., volatile memory, persistent memory, etc.) of a source host system in response to a failure at that system. One of ordinary skill in the art will recognize other variations, modifications, and alternatives.

3. RDMA Setup Workflow

Figure 3:
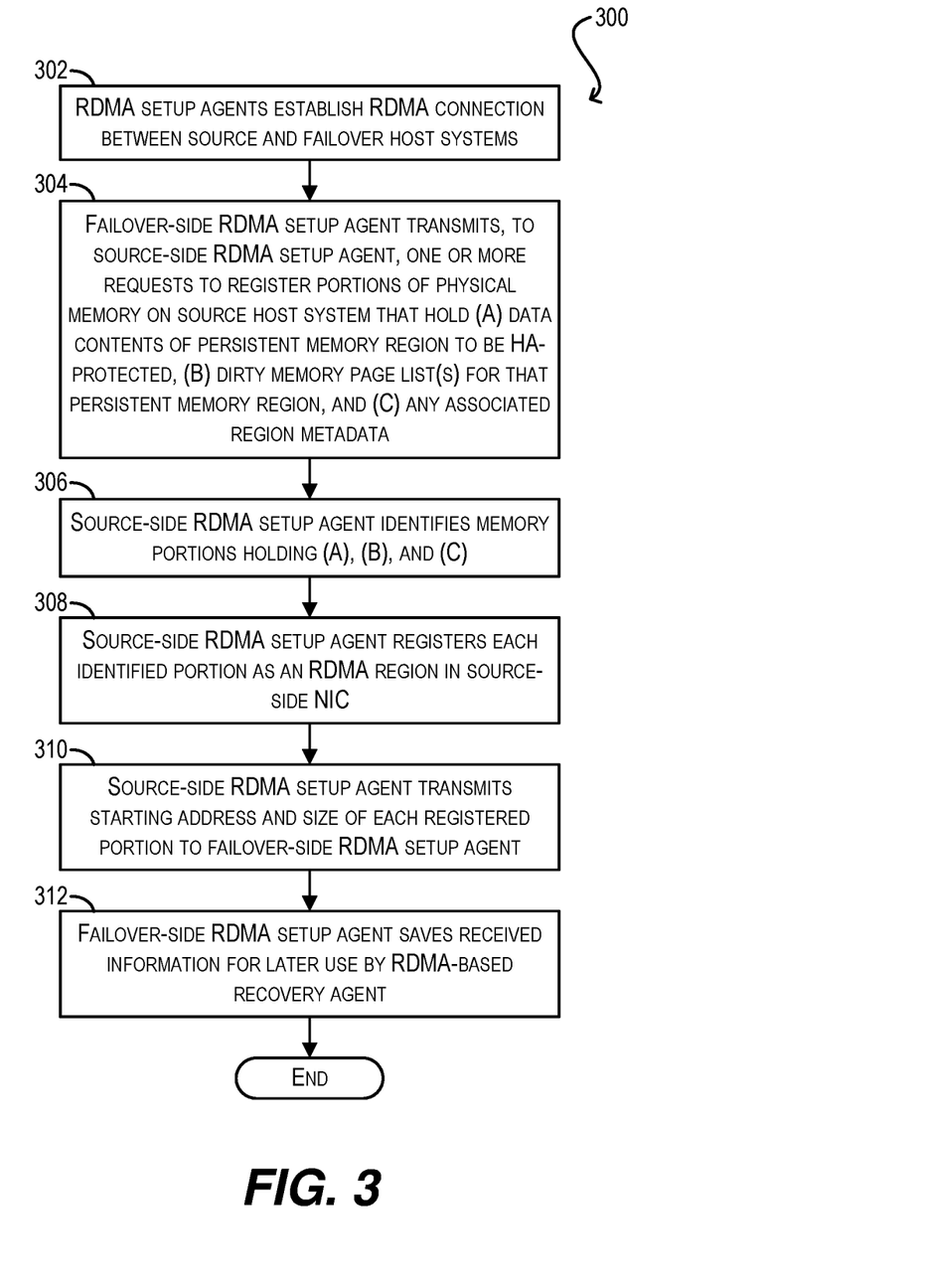
FIG. 3 depicts an RDMA setup workflow that may be executed by a source host system and a failover host system according to certain embodiments.

FIG. 3 depicts a flowchart 300 of the setup workflow that may be executed by RDMA setup agents 202 and 204 of host systems 102 and 104 according to certain embodiments.

Starting with block 302, RDMA setup agents 202 and 204 can establish an RDMA connection between host systems 102 and 104 via their respective RDMA-capable NICs 120 and 122. Although the details of this process are beyond the scope of the present disclosure, it generally involves creating a "queue-pair" on each host system (comprising RDMA send and receive queues) and exchanging information regarding these queue pairs, as well as authentication security keys.

Once the RDMA connection has been established, RDMA setup agent 204 of failover host system 104 can transmit, to RDMA setup agent 202 of source host system 102, one or more requests to register portions of physical memory on source host system 102 that hold (A) the data contents of persistent memory region 124, (B) one or more lists of dirty memory pages in persistent memory region 124 (in other words, memory pages that are written by VM 114 but not yet flushed to shared storage backend 106), and (C) associated metadata for persistent memory region 124 (block 304). With regard to (B) (i.e., the one or more dirty memory page lists), each entry in each list can include the machine page number (MPN) of the dirty memory page in physical memory module(s) 116 of source host system 102 and a logical offset for that page in persistent memory region 124. In embodiments where source host system 102 uses PML to track dirty memory pages, the one or more dirty memory page lists can specifically include two lists: a first list of dirty memory pages maintained in a "PML memory" and a second list of dirty memory pages maintained in a "dirty drain buffer" (described in further detail in section (5) below).

With regard to (C) (i.e., associated metadata for persistent memory region 124), this metadata can include, among other things, a mapping between persistent memory region 124 and virtual NVDIMM 126 of VM 114.

In response to the request(s) sent at block 304, RDMA setup agent 202 of source host system 102 can identify the portions of physical memory containing (A), (B), and (C) (block 306), register each of these portions as an RDMA region in source-side NIC 120 (which enables failover-side NIC 122 to access these regions at the time of recovery) (block 308), and transmit the starting memory address and size of each registered memory portion to RDMA setup agent 204 of failover host system 104 (block 310). Or as an alternative to sending the starting memory address and size of each memory portion separately, RDMA setup agent 202 can send the starting memory address and size of a "superblock" within the physical memory of source host system 102 that holds the starting memory addresses and sizes of the registered memory portions. In this scenario, the memory location of the superblock itself will also be registered as an RDMA region on source-side NIC 120.

Finally, at block 312, RDMA setup agent 204 can receive and save the information transmitted at block 310 for later use by RDMA-based recovery agent 206.

4. Recovery Workflow

Figure 4:
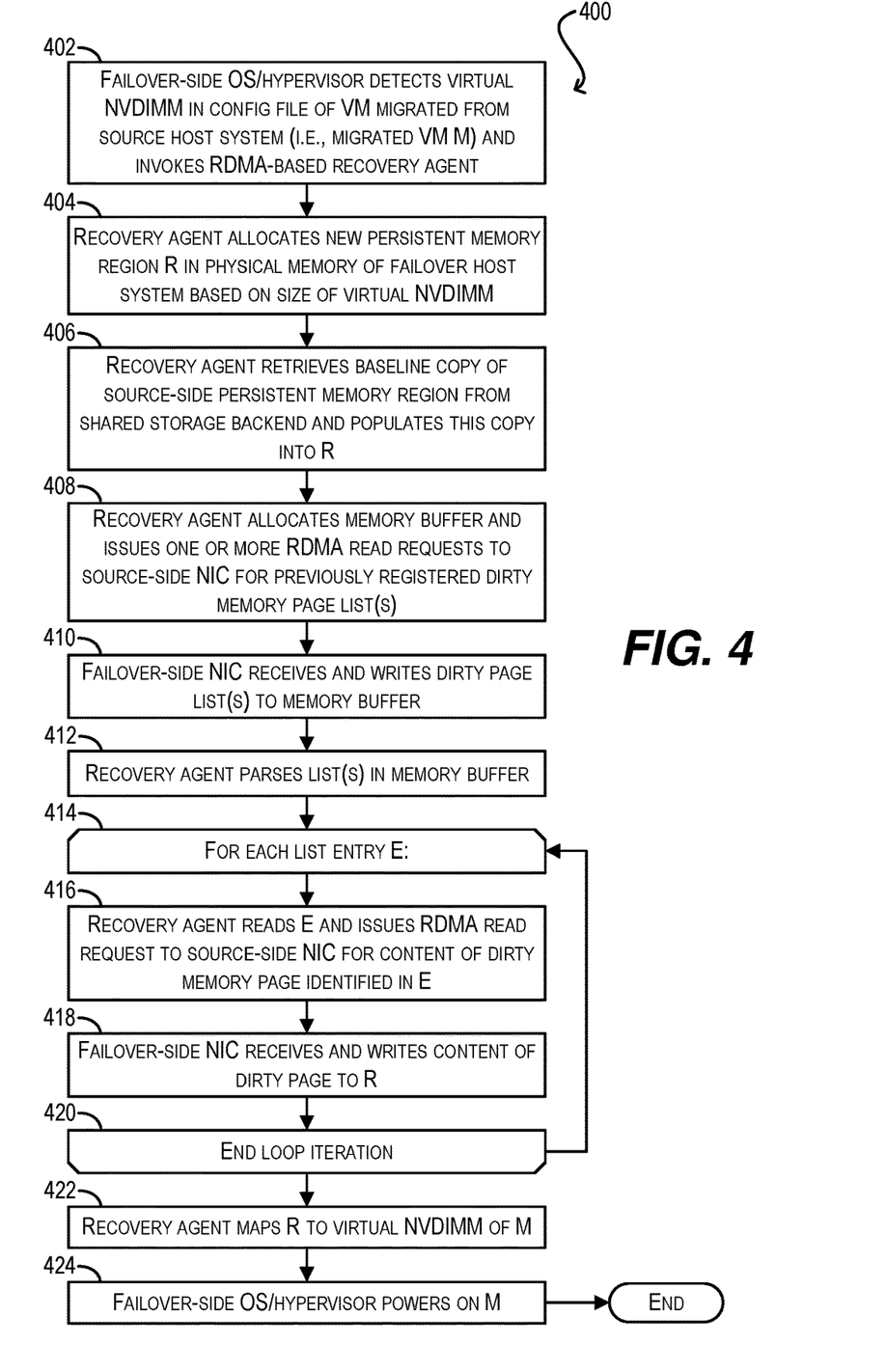
FIG. 4 depicts an RDMA-based recovery workflow that may be executed by a failover host system according to certain embodiments.

FIG. 4 depicts a flowchart 400 of the recovery workflow that may be executed by RDMA-based recovery agent 206 of failover host system 104 in response to a failure at source host system 102 according to certain embodiments. Flowchart 400 assumes that failover host system 104 has been selected by, e.g., a HA management component within computing environment 200 as the failover target for persistent memory region 124/VM 114. Flowchart 400 also assumes that VM 114 has been migrated from source host system 102 to failover host system 104 (resulting in a migrated VM M at failover host system 104).

Starting with block 402, OS/hypervisor 112 of failover host system 104 can detect that a virtual NVDIMM (i.e., virtual NVDIMM 126 shown in FIGS. 1 and 2) exists in the virtual machine configuration file for migrated VM M and can invoke RDMA-based recovery agent 206.

At block 404, RDMA-based recovery agent 206 can allocate a new persistent memory region R in physical memory module(s) 118 of failover host system 104 that is equal in size to the virtual NVDIMM detected at block 402. RDMA-based recovery agent 206 can then retrieve a "baseline" copy of persistent memory region 124 (i.e., a point-in-time copy of persistent memory region 124 as of the last periodic flush at source host system 102) from shared storage backend 106 and populate the received copy into persistent memory region R (block 406).

Upon populating persistent memory region R with the baseline copy of persistent memory region 124 from shared storage backend 106, RDMA-based recovery agent 206 can begin the process of copying over the remaining dirty data for persistent memory region 124 from source host system 102 using RDMA (and in particular, via the RDMA connection established in the setup workflow). For example, at block 408, RDMA-based recovery agent 206 can allocate a memory buffer in physical memory module(s) 118 and can issue, via NIC 122, one or more RDMA read requests to source-side NIC 120 for the one or more dirty memory page lists previously registered at block 308 of flowchart 300. These requests, which can include the starting memory addresses and sizes of the source-side memory regions holding the lists, can cause NIC 120 of source host system 102 to retrieve the list(s) from physical memory module(s) 116 and send them to NIC 122 of failover host system 104, which can receive and write the list(s) to the memory buffer allocated at block 408 (block 410).

At block 412, RDMA-based recovery agent 206 can parse the dirty memory page list(s) in the memory buffer and process each entry E in the list(s) (either sequentially or in parallel) via a loop beginning at block 414. Within this loop, RDMA-based recovery agent 206 can read entry E, which can include the source-side MPN for the dirty memory page corresponding to E and the logical offset of this memory page in persistent memory region 124. RDMA-based recovery agent 206 can then issue, via NIC 122, an RDMA read request directed to the MPN and identifying the logical offset to NIC 120 of source host system 102 (block 416). This can cause NIC 120 to retrieve the data of that memory page from physical memory module(s) 116 and send it to NIC 122, which can receive and write the data at the specified logical offset within persistent memory region R, thereby copying the page's contents into R (block 418).

At block 420, RDMA-based recovery agent 206 can reach the end of the current loop iteration and return to block 414 in order to process the next dirty memory page entry. Once all of the entries have been processed, persistent memory region R on failover host system 104 will be fully consistent with persistent memory region 124 on source host system 102. Accordingly, RDMA-based recovery agent 206 can map persistent memory region R to the virtual NVDIMM of migrated VM M (block 422).

Finally, at block 424, OS/hypervisor 112 of failover host system 104 can power on migrated VM M and flowchart 400 can end.

It should be appreciated that flowchart 400 is illustrative and various modifications are possible. For example, as noted with respect to the setup workflow of FIG. 3, in some embodiments failover host system 104 may receive the starting memory address and size of a superblock which contains the starting addresses/sizes of the dirty memory page list(s) and the content of persistent memory region 124. In these embodiments, RDMA-based recovery agent 206 can first retrieve the data of the superblock via an RDMA read, parse the superblock data to identify the address and size information included therein, and then issue subsequent RDMA reads using that identified information.

Further, although not shown in FIG. 4, upon completing the reconstruction of persistent memory region 124 on failover host system 104 (in the form of persistent memory region R), RDMA-based recovery agent 206 can invoke RDMA setup agent 204 in order to carry out a new setup workflow with another host system in computing environment 200, thereby allowing that other host system to act as a new failover target for migrated VM M and persistent memory region R in the case where host system 104 experiences a failure.

5. Support for PML-Based Dirty Page Tracking

As mentioned previously, in certain embodiments source host system 102 may utilize a CPU hardware feature known as PML to facilitate the tracking of memory pages dirtied by VM 114 in persistent memory region 124. When PML is enabled, the CPU of source host system 102 automatically records the MPN of each memory page that is dirtied by VM 114 in an area of physical memory referred to as PML memory. This PML memory has a fixed size; accordingly, when the PML memory becomes full, a trap to OS/hypervisor 110 occurs and the OS/hypervisor moves the dirty memory pages identified in the PML memory to a separate, larger memory area referred to as a dirty drain buffer. An asynchronous process of OS/hypervisor 110 then periodically flushes the dirty memory pages identified in the dirty drain buffer to the copy of persistent memory region 124 in shared storage backend 106.

In embodiments where source host system 102 uses PML, it is not sufficient for RDMA-based recovery agent 206 to retrieve the list of dirty memory pages in the dirty drain buffer of source host system 102 and copy over the contents of those pages; recovery agent 206 should also retrieve the list of dirty memory pages in the PML memory for VM 114 and copy over the contents of the PML pages as well. According, in these embodiments, the setup workflow shown in FIG. 3 can be modified so that RDMA setup agent 102 of source host system 102 registers the portion of physical memory holding the PML memory of VM 114 and provides the starting memory address and size of this registered memory portion to RDMA setup agent 104 of failover host system 104 (either separately or via the superblock method).

Further, the recovery workflow shown in FIG. 4 can be modified so that RDMA-based recovery agent 206 retrieves the list of dirty memory pages from the PML memory on source host system 104 and copies over the content of each PML page via RDMA, after performing these steps for the dirty memory pages in the dirty drain buffer. This ensures that persistent memory region R of failover host system 104 will include all of the changes made to persistent memory region 124 of source host system 102 as recorded in the PML memory and the dirty drain buffer.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
receiving, by a source host system from a failover host system, one or more remote direct memory access (RDMA) requests to register, for RDMA access by the failover host system:
  a first portion of a physical memory of the source host system designated as being protected via a high availability (HA) mechanism; and
  a second portion of the physical memory holding one or more dirty page lists associated with the first portion; and
in response to the one or more RDMA requests:
  registering, by the source host system, the first and second portions as first and second RDMA regions in a source-side RDMA-capable network interface controller (NIC) of the source host system; and
  transmitting, by the source host system, information pertaining to the first and second RDMA regions to the failover host system.

2. The method of claim 1 wherein the information includes a starting memory address and a size for the first and second RDMA regions.

3. The method of claim 1 further comprising:
periodically flushing data contents of the first portion to a storage backend shared by the source host system and the failover host system.

4. The method of claim 1 further comprising, after occurrence of a failure at the source host system:
receiving, at the source-side RDMA-capable NIC, one or more RDMA read requests from a failover-side RDMA-capable NIC of the failover host system, the one or more RDMA read requests being directed to the second RDMA region; and
transmitting, by the source-side RDMA-capable NIC to the failover-side RDMA-capable NIC, data from the second portion.

5. The method of claim 4 wherein the failure is caused by an unrecoverable error in an operating system or hypervisor kernel of the source host system.

6. The method of claim 1 wherein the first portion is a persistent memory region.

7. The method of claim 1 wherein the one or more dirty page lists include a first list comprising dirty memory pages identified in a Page Modification Logging (PML) memory of the source host system and a second list comprising dirty memory pages identified in a dirty drain buffer of the source host system.

8. A non-transitory computer readable storage medium having stored thereon program code executable by a source host system, the program code embodying a method comprising:
receiving, from a failover host system, one or more remote direct memory access (RDMA) requests to register, for RDMA access by the failover host system:
  a first portion of a physical memory of the source host system designated as being protected via a high availability (HA) mechanism; and
  a second portion of the physical memory holding one or more dirty page lists associated with the first portion; and
in response to the one or more RDMA requests:
  registering the first and second portions as first and second RDMA regions in a source-side RDMA-capable network interface controller (NIC) of the source host system; and
  transmitting information pertaining to the first and second RDMA regions to the failover host system.

9. The non-transitory computer readable storage medium of claim 8 wherein the information includes a starting memory address and a size for the first and second RDMA regions.

10. The non-transitory computer readable storage medium of claim 8 wherein the method further comprises:
periodically flushing data contents of the first portion to a storage backend shared by the source host system and the failover host system.

11. The non-transitory computer readable storage medium of claim 8 wherein the method further comprises, after occurrence of a failure at the source host system:
receiving, by the source-side RDMA-capable NIC, one or more RDMA read requests from a failover-side RDMA-capable NIC of the failover host system, the one or more RDMA read requests being directed to the second RDMA region; and
transmitting, by the source-side RDMA-capable NIC to the failover-side RDMA-capable NIC, data from the second portion.

12. The non-transitory computer readable storage medium of claim 11 wherein the failure is caused by an unrecoverable error in an operating system or hypervisor kernel of the source host system.

13. The non-transitory computer readable storage medium of claim 8 wherein the first portion is a persistent memory region.

14. The non-transitory computer readable storage medium of claim 8 wherein the one or more dirty page lists include a first list comprising dirty memory pages identified in a Page Modification Logging (PML) memory of the source host system and a second list comprising dirty memory pages identified in a dirty drain buffer of the source host system.

15. A host system comprising:
a processor;

a physical memory;

a remote direct memory access (RDMA)-capable network interface controller (NIC); and a non-transitory computer readable medium having stored thereon program code that, when executed by the processor, causes the processor to:

receive, from another host system, one or more RDMA requests to register, for RDMA access by the said another host system:

a first portion of the physical memory designated as being protected via a high availability (HA) mechanism; and a second portion of the physical memory holding one or more dirty page lists associated with the first portion; and in response to the one or more RDMA requests:

register the first and second portions as first and second RDMA regions in the RDMA-capable NIC; and transmit information pertaining to the first and second RDMA regions to said another host system.

16. The host system of claim 15 wherein the information includes a starting memory address and a size for the first and second RDMA regions.

17. The host system of claim 15 wherein the program code further causes the processor to:

periodically flush data contents of the first portion to a storage backend shared by the host system and said another host system.

18. The host system of claim 15 wherein, after occurrence of a failure at the host system, the RDMA-capable NIC:

receives one or more RDMA read requests from another RDMA-capable NIC of said another host system, the one or more RDMA read requests being directed to the second RDMA region; and transmits, to said another RDMA-capable NIC, data from the second portion.

19. The host system of claim 18 wherein the failure is caused by an unrecoverable error in an operating system or hypervisor kernel of the host system.

20. The host system of claim 15 wherein the first portion is a persistent memory region.

21. The host system of claim 15 wherein the one or more dirty page lists include a first list comprising dirty memory pages identified in a Page Modification Logging (PML) memory of the host system and a second list comprising dirty memory pages identified in a dirty drain buffer of the host system.

* * * * *